United States Patent
Cui

(10) Patent No.: US 12,267,166 B2
(45) Date of Patent: Apr. 1, 2025

(54) ELECTRONIC DEVICE AND METHOD FOR WIRELESS COMMUNICATION, AND COMPUTER-READABLE STORAGE MEDIUM

(71) Applicant: Sony Group Corporation, Tokyo (JP)

(72) Inventor: Tao Cui, Beijing (CN)

(73) Assignee: SONY GROUP CORPORATION, Tokyo (JP)

( * ) Notice: Subject to any disclaimer, the term of this patent is extended or adjusted under 35 U.S.C. 154(b) by 365 days.

(21) Appl. No.: 17/789,225

(22) PCT Filed: Feb. 8, 2021

(86) PCT No.: PCT/CN2021/075902
§ 371 (c)(1),
(2) Date: Jun. 27, 2022

(87) PCT Pub. No.: WO2021/160076
PCT Pub. Date: Aug. 19, 2021

(65) Prior Publication Data
US 2023/0035410 A1    Feb. 2, 2023

(30) Foreign Application Priority Data
Feb. 14, 2020  (CN) .......................... 202010093281.5

(51) Int. Cl.
*H04L 1/08* (2006.01)
*H04W 72/0446* (2023.01)
(52) U.S. Cl.
CPC ........... *H04L 1/08* (2013.01); *H04W 72/0446* (2013.01)
(58) Field of Classification Search
None
See application file for complete search history.

(56) References Cited

U.S. PATENT DOCUMENTS

2021/0337428 A1* 10/2021 Li ..................... H04W 72/0446
2024/0089953 A1*  3/2024 Takahashi ......... H04W 72/1268

FOREIGN PATENT DOCUMENTS

| CN | 110536458 A | 12/2019 |
| CN | 110708765 A | 1/2020 |

(Continued)

OTHER PUBLICATIONS

Nokia: "Introduction of NR-U", 3GPP Draft; RP-192636, 3rd Generation Partnership Project (3GPP), Mobile Competence Centre ; 650, Route Des Lucioles ; F-06921 Sophia-Antipolis Cedex ; France vol. RAN WGI, No. Reno, USA; Nov. 18, 2019-Nov. 22, 2019 Dec. 7, 2019 (Dec. 6, 2019), XP051838456Retrieved from the Internet: URL: https://ftp.3gpp.org/tsg_ran/TSG_RAN/T SGR_86/Docs/RP-192636.zip 38214_CR0051_(Rel-16)_ RI-1913633.docx [retrieved on Dec. 6, 2019].

(Continued)

*Primary Examiner* — Shukri Taha
(74) *Attorney, Agent, or Firm* — XSENSUS LLP

(57) ABSTRACT

An electronic device includes a processing circuit configured to: perform repeated transmission of transmission blocks from among first to (repK)th transmission blocks starting from an nth time domain position when a base station that is due to provide services for an electronic device performs repeated transmission of the first to (repK)th transmission blocks and when it is detected that the nth time domain position is available when the first n−1 consecutive time domain positions from among predetermined consecutive time domain positions configured by the base station and used for repeated transmission are not available; and determine, on the basis of a first redundancy version mode received from the base station, a redundancy version number corresponding to each transmitted transmission block, wherein repK is the first number of repeated transmissions (Continued)

received from the base station, and n is an integer at least one and less than or equal to repK.

18 Claims, 9 Drawing Sheets

(56) References Cited

FOREIGN PATENT DOCUMENTS

| | | | |
|---|---|---|---|
| JP | 2019521623 A | 7/2019 | |
| JP | 2021502773 A | 1/2021 | |
| JP | 2021532632 A | 11/2021 | |
| WO | WO-2019093841 A1 | 5/2019 | |
| WO | 2020/033689 A | 2/2020 | |
| WO | WO-2020030174 A1 | 2/2020 | |
| WO | WO-2021161396 A1 * | 8/2021 | ........... H04L 1/1819 |

OTHER PUBLICATIONS

International Search Report and Written Opinion mailed on Apr. 25, 2021, received for PCT Application PCT/CN2021/075902, filed on Feb. 8, 2021, 11 pages including English Translation.

Sony, "Remaining issues on configured grant enhancement for NR-U", 3GPP TSG RAN WG1 #100bis, R1-2001814, Apr. 20-30, 2020, 3 pages.

* cited by examiner

ELECTRONIC DEVICE AND METHOD FOR WIRELESS COMMUNICATION, AND COMPUTER-READABLE STORAGE MEDIUM

CROSS-REFERENCE TO RELATED APPLICATIONS

The present application is based on PCI filing PCT/CN2021/075902 filed Feb. 8, 2021, which claims the priority to Chinese Patent Application No. 202010093281.5, titled "ELECTRONIC DEVICE AND METHOD FOR WIRELESS COMMUNICATION, AND COMPUTER-READABLE STORAGE MEDIUM", filed on Feb. 14, 2020 with the Chinese Patent Office, the entire contents of each are incorporated herein by reference in its entirety.

TECHNICAL FIELD

The present disclosure relates to the technical field of wireless communications, and in particular to repeated transmission of transport blocks in an unscheduled manner on an unlicensed frequency band. More specifically, the present disclosure relates to an electronic apparatus and method for wireless communications and a computer-readable storage medium.

BACKGROUND

Communications on an unlicensed frequency band are performed based on a channel occupation fair competition mechanism. After obtaining configuration information about available resources from a base station, the user equipment performs idle channel detection to try to occupy preconfigured resources for data transmission. However, in a case that it is found that the channel is busy at the preconfigured position where the channel may be accessed, the user equipment cannot transmit data on the channel resource preconfigured by the base station.

SUMMARY

A brief summary of the present disclosure is given hereinafter, so as to provide basic understanding in some aspects of the present disclosure. It should be understood that the summary is not an exhaustive overview of the present disclosure. The summary is not intended to determine a critical part or an important pail of the present disclosure or limit the scope of the present disclosure. A purpose of the summary is only to provide some concepts in a simplified manner, which serves as a preface of a more detailed description described later.

According to an aspect of the present disclosure, an electronic apparatus for wireless communications is provided. The electronic apparatus includes processing circuitry. The processing circuitry is configured to: in performing repeated transmission on transport blocks from a first transport block to a. (repK)th transport block to a base station serving the electronic apparatus, if it is detected that an n-th time domain position is available in a case that first n−1 consecutive time domain positions in predetermined consecutive time domain positions configured by the base station for the repeated transmission are unavailable, perform repeated transmission on at least a part of the transport blocks from the first transport block to the (repK)th transport block starting at the n-th time domain position; and determine a redundancy version number corresponding to each of the transmitted transport blocks based on a first redundancy version pattern received from the base station. repK represents a first repeated transmission number and is received from the base station, and n is an integer greater than or equal to 1 and less than or equal to repK.

According to another aspect of the present disclosure, a method for wireless communications is provided. The method includes: in performing repeated transmission on transport blocks from a first transport block to a (repK)th transport block to a base station serving the electronic apparatus, if it is detected that an n-th time domain position is available in a case that first n−1 consecutive time domain positions in predetermined consecutive time domain positions configured by the base station for the repeated transmission are unavailable, performing repeated transmission on at least a part of the transport blocks from the first transport block to the (repK)th transport block starting at the n-th time domain position. A redundancy version number corresponding to each of the transmitted transport blocks is determined based on a first redundancy version pattern received from the base station. repK represents a first repeated transmission number and is received from the base station, and n is an integer greater than or equal to 1 and less than or equal to repK.

According to other aspects of the present disclosure, a computer program code and a computer program product for performing the method for wireless communications, and a computer-readable storage medium storing the computer program code for performing the method for wireless communications are further provided.

Hereinafter, preferred embodiments of the present disclosure are described in detail in conjunction with the drawings, and these and other advantages of the present disclosure become more apparent.

BRIEF DESCRIPTION OF THE DRAWINGS

To further describe the above and other advantages and features of the present disclosure, detailed description will be made in the following taken in conjunction with drawings. The drawings, together with the detailed description below, are incorporated into and form a part of the specification. Elements having the same function and structure are denoted by the same reference numerals. It should be noted that the drawings only illustrate typical embodiments of the present disclosure and should not be seen as a limitation to the scope of the present disclosure. In the drawings.

DETAILED DESCRIPTION OF THE EMBODIMENTS

Figure 1:
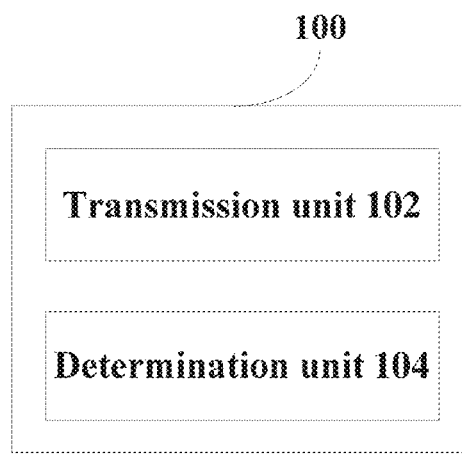
FIG. 1 shows a block diagram of functional modules of an electronic apparatus for wireless communications according to an embodiment of the present disclosure.

An exemplary embodiment of the present disclosure will be described hereinafter in conjunction with the drawings. For the purpose of conciseness and clarity, not all features of an embodiment are described in this specification. However, it should be understood that multiple decisions specific to the embodiment have to be made in a process of developing any such embodiment to realize a particular object of a developer, for example, conforming to those constraints related to a system and a business, and these constraints may change as the embodiments differs. Furthermore, it should also be understood that although the development work may be very complicated and time-consuming, for those skilled in the art benefiting from the present disclosure, such development work is only a routine task.

Here, it should also be noted that in order to avoid obscuring the present disclosure due to unnecessary details, only a device structure and/or processing steps closely related to the solution according to the present disclosure are illustrated in the drawings, and other details having little relationship to the present disclosure are omitted.

Hereinafter, the embodiments of the present disclosure are described in detail with reference to the accompanying drawings.

FIG. 1 shows a block diagram of functional modules of an electronic apparatus 100 for wireless communications according to an embodiment of the present disclosure. As shown in FIG. 1, the electronic apparatus 100 includes: a transmission unit 102 and a determination unit 104. The transmission unit 102 may be configured to, in performing repeated transmission on transport blocks from a first transport block to a (repK)th transport block to a base station serving the electronic apparatus, if it is detected that an n-th time domain position is available in a case that first n−1 consecutive time domain positions in predetermined consecutive time domain positions configured by the base station for the repeated transmission are unavailable, perform repeated transmission on at least a part of the transport blocks from the first transport block to the (repK)th transport block starting at the n-th time domain position. The determination unit 104 may be configured to determine a redundancy version number corresponding to each of the transmitted transport blocks based on a first redundancy version pattern received from the base station. repK represents a first repeated transmission number received from the base station, and n is an integer greater than or equal to 1 and less than or equal to repK.

The transmission unit 102 and the determination unit 104 may be implemented by one or more processing circuitry, and the processing circuitry, for example, may be implemented as a chip.

The electronic apparatus 100, for example, may be arranged on a user equipment (LIE) side or may be communicatively connected to a UE. It should be further noted that the electronic apparatus 100 may be implemented at a chip level or a device level. For example, the electronic apparatus 100 may function as a user equipment, and may include an external device such as a memory and a transceiver (not shown in FIG. 1). The memory may store programs and related data information for implementing various functions by the user equipment. The transceiver may include one or more communication interfaces to support communication with different devices (for example, a base station, and a user equipment). The implementation of the transceiver is not limited here.

The base station may be, for example, a gNB.

As an example, the predetermined consecutive time domain positions are configured grant (CG) time domain positions pre-allocated by the base station. As an example, the number of the predetermined consecutive time domain positions is greater than or equal to repK. The CG time domain positions may be referred to as CG resources, and a time domain period to which the predetermined consecutive time domain positions belong may be referred to as a CG period.

As an example, the transmission unit 102 may be configured to perform repeated transmissions (which may be referred to as redundant transmissions) on transport blocks (TBs) in an unscheduled manner on an unlicensed frequency band. As an example, the transmission unit 102 may be configured to perform repeated transmissions on the transport blocks by performing a hybrid automatic repeat request HARQ process.

Communications on an unlicensed frequency band are performed based on a channel occupation fair competition mechanism. After obtaining configuration information about available resources in a CG period from a base station, the LIE performs idle channel detection to try to occupy preconfigured resources for data transmission. However, in a case that it is found that the channel is busy at a preconfigured time domain position where the channel may be accessed, the UE cannot transmit transport blocks at the time domain position configured by the base station for repeated transmission. Channel detection is, for example, LBT (Listen Before Talk). As an example, for example, at least a part of the time domain positions pre-allocated by the base station may not be used for transmitting the transport blocks due to LBT failure. As an example, for example, first n−1 consecutive time domain positions in the predetermined consecutive time domain positions configured by the base station for repeated transmission are unavailable due to LBT failure, thus the transport blocks cannot be transmitted at the first n−1 consecutive time domain positions.

On detecting that an n-th time domain position in the predetermined consecutive time domain positions is available, the transmission wilt 102 performs repeated transmission on at least a part of the transport blocks from the first transport block to the (repK)th transport block starting at the n-th time domain position. As an example, the transmission unit 102 performs repeated transmission on at least a part of the transport blocks at consecutive time positions starting from the n-th time domain position.

As an example, the first redundancy version pattern may be one of the redundancy version sequences {0,2,3,1}, {0,3,0,3} and {0,0,0,0}.

The determination unit 104 may determine a redundancy version number corresponding to each of the transmitted transport blocks based on the first redundancy version pattern.

In a case that the electronic apparatus 100 according to the embodiments of the present disclosure finds, at a part of time domain positions of an access channel preconfigured by the base station, that the channel is busy, the electronic apparatus 100 performs repeated transmission on a transport block only after detecting an available time domain position. In addition, the electronic apparatus 100 determines a redundancy version number corresponding to the transmitted transport block, so that the base station may effectively perform combined decoding after receiving the redundant transmission of the transport block.

As an example, the determination unit 104 may be configured to determine a (mod(n−1,4)+1)th data in the first redundancy version pattern as a redundancy version number corresponding to an n-th transport block, where mod( ) represents a remainder operation. In this way, a redundancy version number corresponding to each of the transport blocks may be determined simply and easily.

Taking repK=4 and the first redundant version pattern is a redundant version sequence {0, 2, 3, 1} as an example, in a case that n=1, a redundancy version number corresponding to a first transport block TB0 is a first data in the first redundancy version pattern, that is, the redundancy version number corresponding to the first transport block TB0 is 0; in a case that n=2, a redundancy version number corresponding to a second transport block TB1 is a second data in the first redundancy version pattern, that is, the redundancy version number corresponding to the second transport block TB1 is 2; in a case that n=3, a redundancy version number corresponding to a third transport block TB2 is a third data in the first redundancy version pattern, that is, the redundancy version number corresponding to the third transport block TB2 is 3; and in a case that n=4, a redundancy version number corresponding to a fourth transport block TB3 is a fourth data in the first redundancy version pattern, that is, the redundancy version number corresponding to the fourth transport block TB3 is 1.

Taking repK=4 and the first redundant version pattern is a redundant version sequence {0, 3, 0, 3} as an example, in a case that n=1, a redundancy version number corresponding to a first transport block TB0 is a first data in the first redundancy version pattern, that is, the redundancy version number corresponding to the first transport block TB0 is 0; in a case that n=2, a redundancy version number corresponding to a second transport block TB1 is a second data in the first redundancy version pattern, that is, the redundancy version number corresponding to the second transport block TB1 is 3; in a case that n=3, a redundancy version number corresponding to a third transport block TB2 is a third data in the first redundancy version pattern, that is, the redundancy version number corresponding to the third transport block TB2 is 0; and in a case that n=4, a redundancy version number corresponding to a fourth transport block TB3 is a fourth data in the first redundancy version pattern, that is, the redundancy version number corresponding to the fourth transport block TB3 is 3.

Taking repK=4 and the first redundant version pattern is a redundant version sequence {0, 0, 0, 0} as an example, in a case that n=1, a redundancy version number corresponding to a first transport block TB0 is a first data in the first redundancy version pattern, that is, the redundancy version number corresponding to the first transport block TB0 is 0; in a case that n=2, a redundancy version number corresponding to a second transport block TB1 is a second data in the first redundancy version pattern, that is, the redundancy version number corresponding to the second transport block TB1 is 0; in a case that n=3, a redundancy version number corresponding to a third transport block TB2 is a third data in the first redundancy version pattern, that is, the redundancy version number corresponding to the third transport block TB2 is 0; and in a case that n=4, a redundancy version number corresponding to a fourth transport block TB3 is a fourth data in the first redundancy version pattern, that is, the redundancy version number corresponding to the fourth transport block TB3 is 0.

As an example, the transmission unit 102 may be configured to abandon transmitting first n−1 transport blocks in the transport blocks from the first transport block to the (repK)th transport block in the first n−1 consecutive time domain positions in the predetermined consecutive time domain positions, and transmit at least the n-th transport block starting at the n-th time domain position detected as available in the predetermined consecutive time domain positions.

As an example, in a case that the transmission unit 102 finds that a channel is busy at the first n−1 consecutive time domain positions in the predetermined consecutive time domain positions preconfigured by the base station that at which the channel may be accessed, the transmission unit 102 abandons transmitting first n−1 transport blocks in the first n−1 consecutive time domain positions. In addition, transmission unit 102 continuously performs channel detection in a CG period. In a case of successfully detecting that the channel is idle at the n-th time domain position in the predetermined consecutive time domain positions for repeated transmission, the transmission unit 102 transmits the n-th transport block at the n-th time domain position.

The base station pre-allocates the electronic apparatus 100 with multiple time domain periods for repeated transmission. These periods are of the same type as the time domain period to which the predetermined consecutive time domain positions for repeated transmissions belong. In the following Figures, each of pre-allocated time domain periods for repeated transmissions is labeled CG-period_0. A time domain period that is not allocated for repeated transmission by the electronic apparatus 100 is of a different type from the time domain period to which the predetermined consecutive time domain positions for repeated transmission belong. The time domain period that is not allocated for repeated transmission by the electronic consecutive 100 is labeled CG-period_1.

In FIGS. 2 to 8 described below, descriptions are provided by taking that repK=4 and the first redundancy version pattern is the redundancy version sequence {0, 2, 3, 1} as an example. A first time domain position marked with "X" in a first CG-period_0 in the Figures represents a first time domain position in the predetermined consecutive time domain positions pre-configured by the base station for repeated transmission. Hereinafter, successive time domain positions after the first time domain position are respectively referred to as a second time domain position, a third time domain position, a fourth time domain position and the like in the predetermined consecutive time domain positions.

Figure 2:
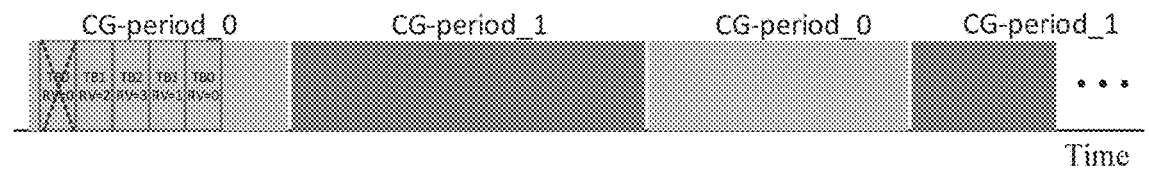
FIG. 2 shows a schematic diagram of transmitted transport blocks and redundancy version numbers corresponding to the transport blocks according to an embodiment of the present disclosure.

FIG. 2 shows a schematic diagram of transmitted transport blocks and redundancy version numbers corresponding to the transport blocks according to an embodiment of the present disclosure.

In FIG. 2, when the transmission unit 102 finds that the channel is busy at the first time domain position in the predetermined consecutive time domain positions preconfigured by the base station for repeated transmission, the transmission unit 102 abandons transmitting the first transport block TB0 at the first time domain position. Then, when the transmission unit 102 successfully detects that the channel is idle at the second time domain position in the predetermined consecutive time domain positions for repeated transmission, the transmission unit 102 transmits the second transport block TB1 at the second time domain position. As described above, the redundancy version number RV corresponding to the second transport block TB1 is the second data in the first redundancy version pattern, that is, the RV corresponding to the second transport block TB1 is equal to 2.

Figure 3:
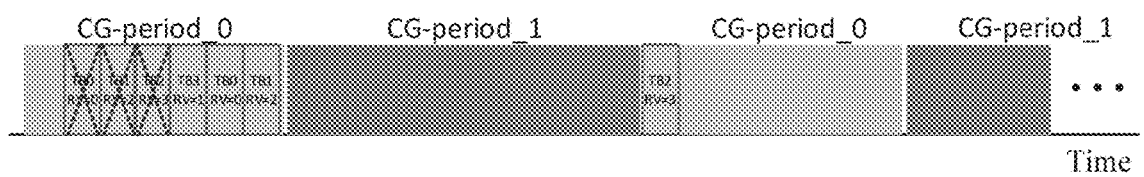
FIG. 3 shows a schematic diagram of transmitted transport blocks and redundancy version numbers corresponding to the transport blocks according to another embodiment of the present disclosure.

FIG. 3 shows a schematic diagram of transmitted transport blocks and redundancy version numbers corresponding to the transport blocks according to another embodiment of the present disclosure.

In FIG. 3, when the transmission unit 102 finds that the channel is busy at first three time domain positions (that is, from a first time domain position to a third time domain position) in the predetermined consecutive time domain positions preconfigured by the base station for repeated transmission, the transmission unit 102 abandons transmitting the first transport block TB0 to the third transport block TB2 at the first three time domain positions. Then, when the transmission unit 102 successfully detects that the channel is idle at a fourth time domain position in the predetermined consecutive time domain positions for repeated transmission, the transmission unit 102 transmits a fourth transport block TB3 at the fourth time domain position. As described above, the redundancy version number corresponding to the fourth transport block TB3 is the fourth data in the first redundancy version pattern, that is, the RV corresponding to the fourth transport block TB3 is equal to 1.

As an example, the transmission unit 102 may, on detecting that there are i additional available time domain positions in a time domain period to which the predetermined consecutive time domain positions belong after the n-th transport block to the (repK)th transport block are sequentially transmitted in available time domain positions in the predetermined consecutive time domain positions, sequentially transmit first i transport blocks in the abandoned first n−1 transport blocks by using the i additional available time domain positions, and may sequentially transmit transport blocks, which are in the transport blocks from the first transport block to the (repK)th transport block and have not been transmitted in the time domain period, in available time domain positions in a next time domain period of the same type as the time domain period, or abandons transmitting the transport blocks which have not been transmitted in the time domain period, i is greater than or equal to 0 and less than or equal to n−1.

After the transmission unit 102 transmits the n-th transport block at the n-th time domain position, the electronic apparatus 100 keeps occupying the channel, thereby sequentially transmitting the transport blocks after the n-th transport block. In a case that there are additional available time domain positions in the time domain period after the (repK)th transport block is transmitted, the transmission unit 102 transmits transport blocks not being transmitted due to channel detection failure after the (repK)th transport block.

As an example, in a case that all transport blocks not being transmitted due to channel detection failure may be transmitted at the additional available time domain positions, the transmission unit 102 transmits all the transport blocks not being transmitted due to channel detection failure in the time domain period.

As shown in FIG. 2, after transmitting the second transport block TB1 in the time domain period CG-period_0, the transmission unit 102 continuously transmits TB2 and TB3 (RVs of TB2 and TB3 are 3 and 1 respectively). After transmitting TB1 to TB3, since there are additional available time domain positions in the time domain period and the additional available time domain positions are sufficient for transmitting TB0 not being transmitted due to channel detection failure, the transmission unit 102 shifts TB0 after TB3 to transmit TB0 in this time domain period.

As an example, in a case that the additional available time domain positions are not sufficient for transmitting all the transport blocks not being transmitted due to channel detection failure, the transmission unit 102 transmits a part of the transmission blocks, not being transmitted due to channel detection failure, in the time domain period, and transmits the remaining transport blocks, in the transport blocks not being transmitted due to channel detection failure, at available time domain positions in a next time domain period of the same type as the time domain period, so as to ensure that the first transport block to the (repK)th transport block may be completely transmitted. It should be noted that the transmission unit 102 is not to transmit transmission blocks to be transmitted by the electronic apparatus 100 in a time domain period of a different type from the time domain period.

As shown in FIG. 3, after the transmission unit 102 transmits TR3 in the time domain period CG-period_0, although there are additional available time domain positions in the time domain period, the additional available time domain positions are not sufficient for transmitting TBC to TB2 that have not been transmitted due to channel detection failure. Thus, the transmission unit 102 shifts TB0 and TB1 (RVs of TB0 and TB1 are respectively 0 and 2) after TB3 and then transmits TB0 and TB1 in this time domain period, and transmits TB2 (RV of TB2 is 3) in a next time domain period CG-period_0.

Figure 4:
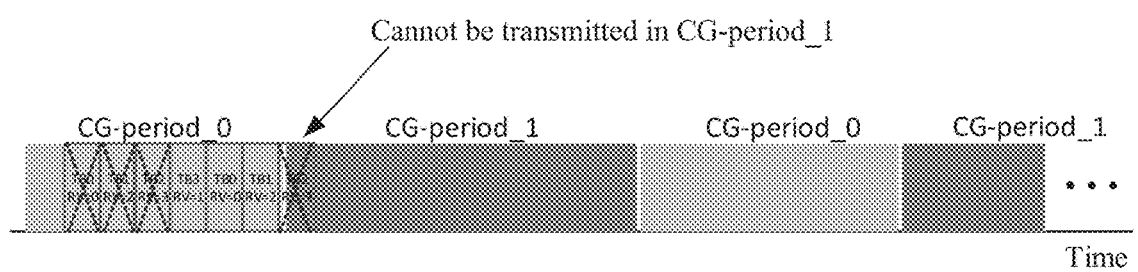
FIG. 4 shows a schematic diagram of transmitted transport blocks and redundancy version numbers corresponding to the transport blocks according to another embodiment of the present disclosure.

FIG. 4 shows a schematic diagram of transmitted transport blocks and redundancy version numbers corresponding to the transport blocks according to another embodiment of the present disclosure. The difference between FIG. 4 and FIG. 3 is that, for TB2 in FIG. 3, which is transmitted in the next time domain period CG-period_0, it is emphasized in FIG. 4 that TB2 should not be transmitted in a different type of CG-period_1 than CG-period_0 (that is, a time domain period not allocated for repeated transmissions performed by the electronic apparatus 100). As an example, the transmission unit 102 may abandon transmitting TB2.

As can be seen from the above descriptions, in the repeated transmission described above in conjunction with FIGS. 2 to 4, the transmission unit 102 cyclically shifts the transport blocks not being transmitted due to channel detection failure.

As an example, the transmission unit 102 may be configured to transmit at least the first transport block starting from the n-th time domain position detected as available in the predetermined consecutive time domain positions.

As an example, in a case that the transmission unit 102 finds that a channel is busy at first n−1 consecutive time domain positions in the predetermined consecutive time domain positions, at which the channel may be accessed, preconfigured by the base station, the transmission unit 102 abandons transmitting first n−1 transport blocks from the first transport block to the (repK)th transport block at the first n−1 consecutive time domain positions. In addition, the transmission unit 102 continuously performs channel detection in a. CC period. In a case of successfully detecting that the channel is idle at the n-th time domain position in the predetermined consecutive time domain positions for repeated transmission, the transmission unit 102 transmits the first transport block at the n-th time domain position.

Figure 5:
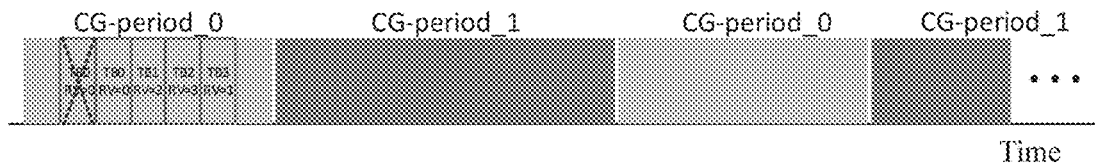
FIG. 5 shows a schematic diagram of transmitted transport blocks and redundancy version numbers corresponding to the transport blocks according to another embodiment of the present disclosure.

FIG. 5 shows a schematic diagram of transmitted transport blocks and redundancy version numbers corresponding to the transport blocks according to another embodiment of the present disclosure.

In FIG. 5, when the transmission unit 102 finds that the channel is busy at the first time domain position in the predetermined consecutive time domain positions preconfigured by the base station for repeated transmission, the transmission unit 102 abandons transmitting the first transport block TBC (RN of the first transport block TB0 is equal to 0) at the first time domain position. Then, when the transmission unit 102 successfully detects that the channel is idle at the second time domain position in the predetermined consecutive time domain positions for repeated transmission, the transmission unit 102 transmits the abandoned first transport block (RV of the first transport block is equal to 0) at the second time domain position.

Figure 6:
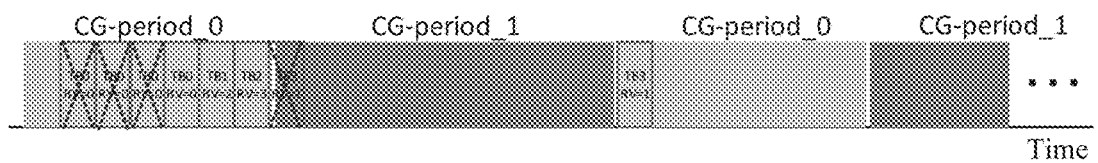
FIG. 6 shows a schematic diagram of transmitted transport blocks and redundancy version numbers corresponding to the transport blocks according to another embodiment of the present disclosure.

FIG. 6 shows a schematic diagram of transmitted transport blocks and redundancy version numbers corresponding to the transport blocks according to another embodiment of the present disclosure.

In FIG. 6, when the transmission unit 102 finds that the channel is busy at a first time domain position to a third time domain position in the predetermined consecutive time domain positions preconfigured by the base station for repeated transmission, the transmission unit 102 abandons transmitting the first transport block TB0 (RV of the first transport block TB0 is equal to 0) at the first time domain position to the third time domain position. Then, when the transmission unit 102 successfully detects that the channel is idle at a fourth time domain position in the predetermined consecutive time domain positions for repeated transmission, the transmission unit 102 transmits the abandoned first transport block (RV of the first transport block is equal to 0) at the fourth time domain position.

As an example, the transmission unit 102 may be configured to, on detecting that there are more than or equal to repK-1 available time domain positions in a time domain period to which the predetermined consecutive time domain positions belong after the first transport block is transmitted, sequentially transmit a second transport block to the (repK)th transport block in the time domain period.

After the transmission unit 102 transmits the first transport block at the n-th time domain position, the electronic apparatus 100 keeps occupying the channel, thereby sequentially transmitting the transport blocks after the first transport block.

As an example, as shown in FIG. 5, after the first transmission block is transmitted, there are more than or equal to three available time domain positions in a time domain period CG-period_0 to which the predetermined consecutive time domain positions for repeated transmission belong, thus the transmission unit 102 sequentially transmits the second transport block to the fourth transport block TB1, TB2, and TB3 in the time domain period (RVs of TB1, TB2, and TB3 are 2, 3, and 1, respectively).

As an example, the transmission unit 102 may be configured to, on detecting that there are j available time domain positions in a time domain period to which the predetermined consecutive time domain positions belong after the first transport block is transmitted, sequentially transmit j transport blocks starting from a second transport block by using the j available time domain positions; and sequentially transmit transport blocks, which are in the transport blocks from the first transport block to the (repK)th transport block and have not been transmitted in the time domain period, in a next time domain period of the same type as the time domain period, or abandon transmitting the transport blocks which have not been transmitted in the time domain period. j is greater than or equal to 0 and less than repK-1.

As an example, as shown in FIG. 6, after the first transport block is transmitted, there are j=2 available time domains in the time domain period CG-period_0 to which the predetermined consecutive time domain positions for repeated transmission belong, thus the transmission unit 102 sequentially transmits two transport blocks starting from the second transport block, that is, TB1 and TB2 (the RVs of TB1 and TB2 are 2 and 3, respectively) at the two available time domain positions, and transmits a fourth transport block TB3 (RV of TB3 is 1) in a next time domain period CG-period_0 of the same type as the time domain period.

Figure 7:
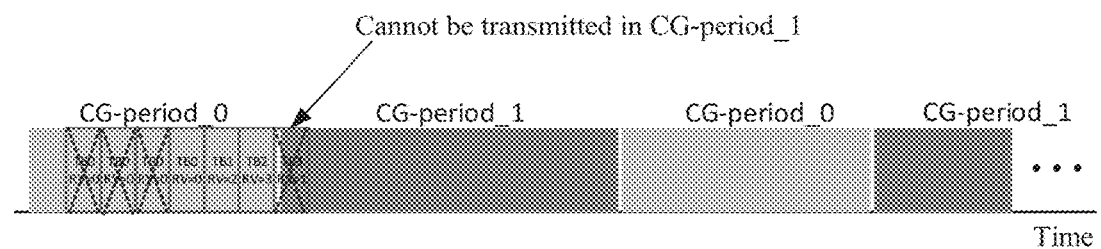
FIG. 7 shows a schematic diagram of transmitted transport blocks and redundancy version numbers corresponding to the transport blocks according to another embodiment of the present disclosure.

FIG. 7 shows a schematic diagram of transmitted transport blocks and redundancy version numbers corresponding to the transport blocks according to another embodiment of the present disclosure. The difference between FIG. 7 and FIG. 6 is that, for TB3 in FIG. 6, which is transmitted in the next time domain period CG-period_0, it is emphasized in FIG. 7 that TB3 should not be transmitted in a different type of CG-period_1 than CG-period_0 (that is, a time domain period not allocated for repeated transmissions performed by the electronic apparatus 100). As an example, the transmission unit 102 may abandon transmitting TB3.

As can be seen from the above descriptions, in the repeated transmission described above in conjunction with FIGS. 5 to 7, the transmission unit 102 entirely shifts the transport blocks not being transmitted due to channel detection failure.

As an example, the determination unit 104 may be configured to modify the first repeated transmission number repK to a second repeated transmission number repK' selected by the electronic apparatus 100, and modify the first redundancy version pattern repK-RV to a second redundancy version pattern repK-RV' selected by the electronic apparatus 100. In this way, repeated transmission is performed on the transport blocks based on the second repeated transmission number and the second redundancy version pattern that are selected by the electronic apparatus 100, thereby improving transmission option of the electronic apparatus 100.

As an example, the second redundancy version pattern may be one of the redundancy version sequences {0,2,3,1}, {0,3,0,3} and {0,0,0,0}.

As an example, the second repeated transmissions number repK' is not equal to the first repeated transmissions number repK, and/or the second redundancy version pattern is not equal to the first redundancy version patter.

As an example, the determination unit 104 may be configured to determine a (mod(m-1,4)+1)th data in the second redundancy version pattern as a redundancy version number corresponding to an m-th transport block, where mod( ) represents a remainder operation, and m is an integer greater than or equal to 1 and less than or equal to repK. In this way, a redundancy version number corresponding to each of the transport blocks may be determined simply and easily.

As an example, the determination unit 104 may be configured to select a second repeated transmission number and a second redundancy version pattern based on the number of remaining available time domain locations in the time domain period to which the predetermined consecutive time domain positions belong. Those skilled in the art may think of other ways for selecting a second repeated transmission number repK' and a second redundancy version pattern, which are not described herein.

As an example, the determination unit 104 may be configured to add the second repeated transmission number and the second redundancy version pattern in an uplink control indication UCI and transmit the second repeated transmission number and the second redundancy version pattern to the base station. That is, the determination unit 104 may add the modified first repeated transmission number (that is, repK') and the modified first redundancy version pattern (that is, the second redundancy version pattern) in the uplink control indication UCI and transmit the modified first repeated transmission number and the modified first redundancy version pattern to the base station.

As an example, the transmission unit 102 may be configured to, on detecting that there are more than or equal to repK' available time domain positions in the time domain period to which the predetermined consecutive time domain positions belong, sequentially transmit the first transport block to the (repK)th transport block starting at the n-th time domain position detected as available in the predetermined consecutive time domain positions in the time domain period.

Figure 8:
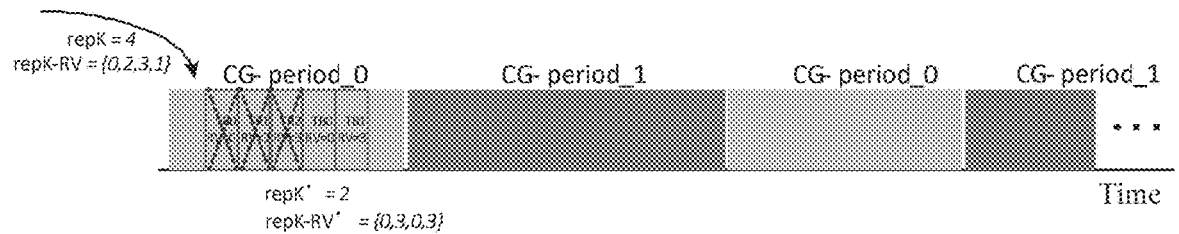
FIG. 8 shows a schematic diagram of transmitted transport blocks and redundancy version numbers corresponding to the transport blocks according to another embodiment of the present disclosure.

FIG. 8 shows a schematic diagram of transmitted transport blocks and redundancy version numbers corresponding to the transport blocks according to another embodiment of the present disclosure. In FIG. 8, repK=4 and the first redundancy version pattern is the redundancy version sequence {0,2,3.1}, and repK'=2 and the second redundancy version pattern is the redundancy version sequence {0,3,0, 3}. repK and the first redundancy version pattern are configured by RRC (Radio Resource Control).

As shown in FIG. 8, when the transmission unit 102 finds that the channel is busy at first three time domain positions (that is, from a first time domain position to a third time domain position) in the predetermined consecutive time domain positions preconfigured by the base station for repeated transmission, the transmission unit 102 abandons transmitting the first transport block TB0 to the third transport block TB2 at the first three time domain positions.

Then, when the transmission unit 102 successfully detects that the channel is idle at a fourth time domain position in the predetermined consecutive time domain positions for repeated transmission, the transmission unit 102, based on the second redundancy version pattern and the repeated transmission number repK, performs repeated transmission starting at the fourth time domain position.

The transmission unit 102, on detecting that there are more than or equal to two available time domain positions in the time domain period CG-period_0 to which the predetermined consecutive time domain positions preconfigured by the base station for repeated transmission belong, sequentially transmits the first transport block to the second transport block starting at the fourth time domain position in the time domain period. As shown in FIG. 8, the transmission unit 102 transmits the first transport block TB0 (a redundancy version number corresponding to TB0 is a first data in the second redundancy version pattern, that is, RV of TB0 is equal to 0) and TB1 (a redundancy version number corresponding to TB1 is a second data in the second redundancy version pattern, that is, Rn of TB1 is equal to 3) starting at the fourth time domain position.

As an example, the transmission unit 102 may be configured to, on detecting that there are k available time domain positions in a time domain period to which the predetermined consecutive time domain positions belong, sequentially transmit the first transport block to a k-th transport block starting at the n-th time domain position detected as available in the predetermined consecutive time domain positions in the time domain period; and sequentially transmit transport blocks, which are in the transport blocks from the first transport block to the (repK')th transport block and have not been transmitted in the time domain period, in a next time domain period of the same type as the time domain period, or abandon transmitting the transport blocks which have not been transmitted in the time domain period. k is greater than or equal to 0 and less than repK'.

In the above descriptions, it is described that the base station preconfigures the repK and the first redundancy version pattern. However, the base station may not preconfigure the repK and the first redundancy version pattern. In a case that the base station does not configure the repK and the first redundancy version pattern, the electronic apparatus 100 may notify the base station of the repeated transmission number and the redundancy version pattern that are used for a current transmission by using a UCI carried in transmission of each of transport blocks. In this case, it is required to add the repeated transmission number and the redundancy version pattern to the UCI.

In the process of describing the electronic apparatus for wireless communications in the embodiments described above, it is apparent that some processing or methods are also disclosed. Hereinafter, an overview of the methods is given without repeating some details disclosed above. However, it should be noted that, although the methods are disclosed in a process of describing the electronic apparatus for wireless communications, the methods do not certainly employ or are not certainly executed by the aforementioned components. For example, the embodiments of the electronic apparatus for wireless communications may be partially or completely implemented with hardware and/or firmware, the methods for wireless communications described below may be executed by a computer-executable program completely, although the methods may also be performed by hardware and/or firmware of the electronic apparatus for wireless communications.

Figure 9:
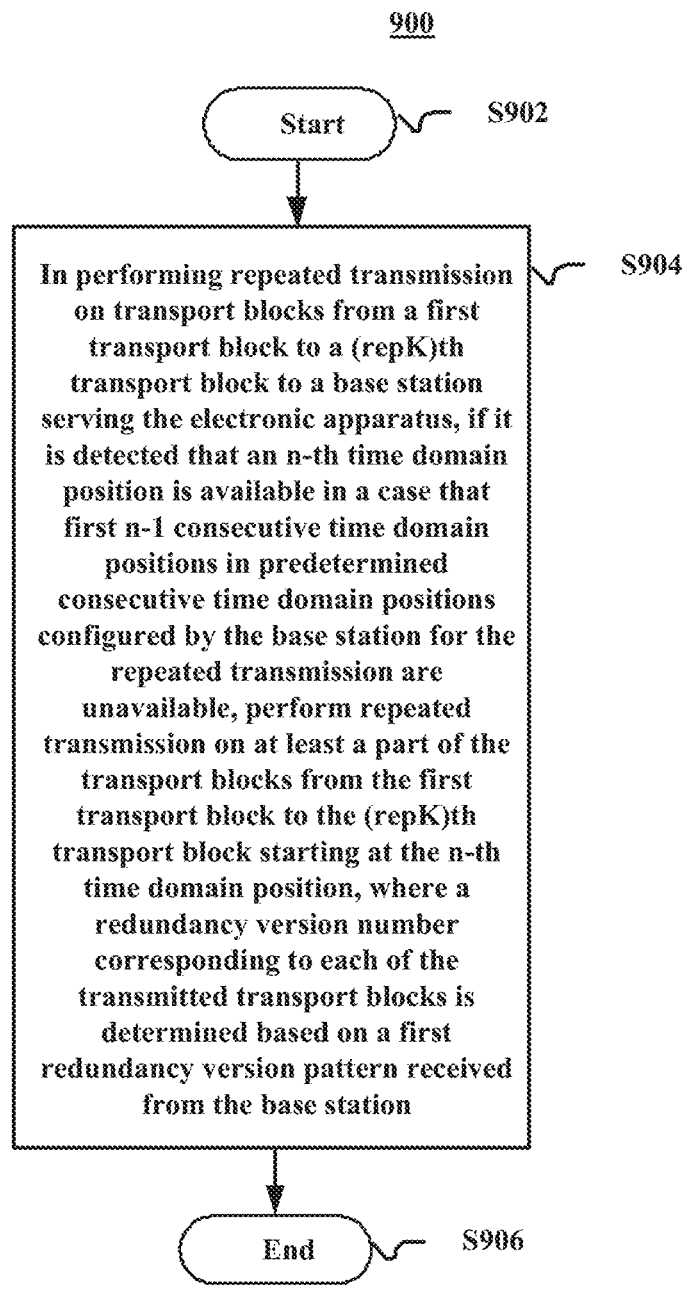
FIG. 9 shows a flow chart of a method for wireless communications according to an embodiment of the present disclosure.

FIG. 9 shows is a flow chart of a method 900 for wireless communications according to an embodiment of the present disclosure. The method 900 starts at step S902. In step S904, in performing repeated transmission on transport blocks from a first transport block to a (repK)th transport block to a base station serving the electronic apparatus, if it is detected that an n-th time domain position is available in a case that first n−1 consecutive time domain positions in predetermined consecutive time domain positions configured by the base station for the repeated transmission are unavailable, repeated transmission is performed on at least a part of the transport blocks from the first transport block to the (repK)th transport block starting at the n-th time domain position. A redundancy version number corresponding to each of the transmitted transport blocks is determined based on a first redundancy version pattern received from the base station. repK represents a first repeated transmission number received from the base station, and n is an integer greater than or equal to 1 and less than or equal to repK. The method 900 ends at step S906. The method 900 may be performed on a UE side.

The method, for example, may be performed by the electronic apparatus 100 described in the first embodiment, and the specific details thereof may be referred to corresponding descriptions above, which are not repeated herein.

The technology according to the present disclosure is applicable to various products.

For example, the electronic apparatus 100 may be implemented as various user equipment. The user equipment may be implemented as a mobile terminal (such as a smart phone, a tablet personal computer (PC), a notebook PC, a portable game terminal, a portable/dongle type mobile router, and a digital camera) or a vehicle-mounted terminal (such as an automobile navigation device). The user equipment may also be implemented as a terminal (also referred to as a machine type communication (MTC) terminal) that executes Machine-to-Machine (M2M) communications. In addition, the user equipment may be a wireless communication module (such as an integrated circuit module including a single chip) installed on each of the above-mentioned terminals.

Application Examples about Base Station

First Application Example

Figure 10:
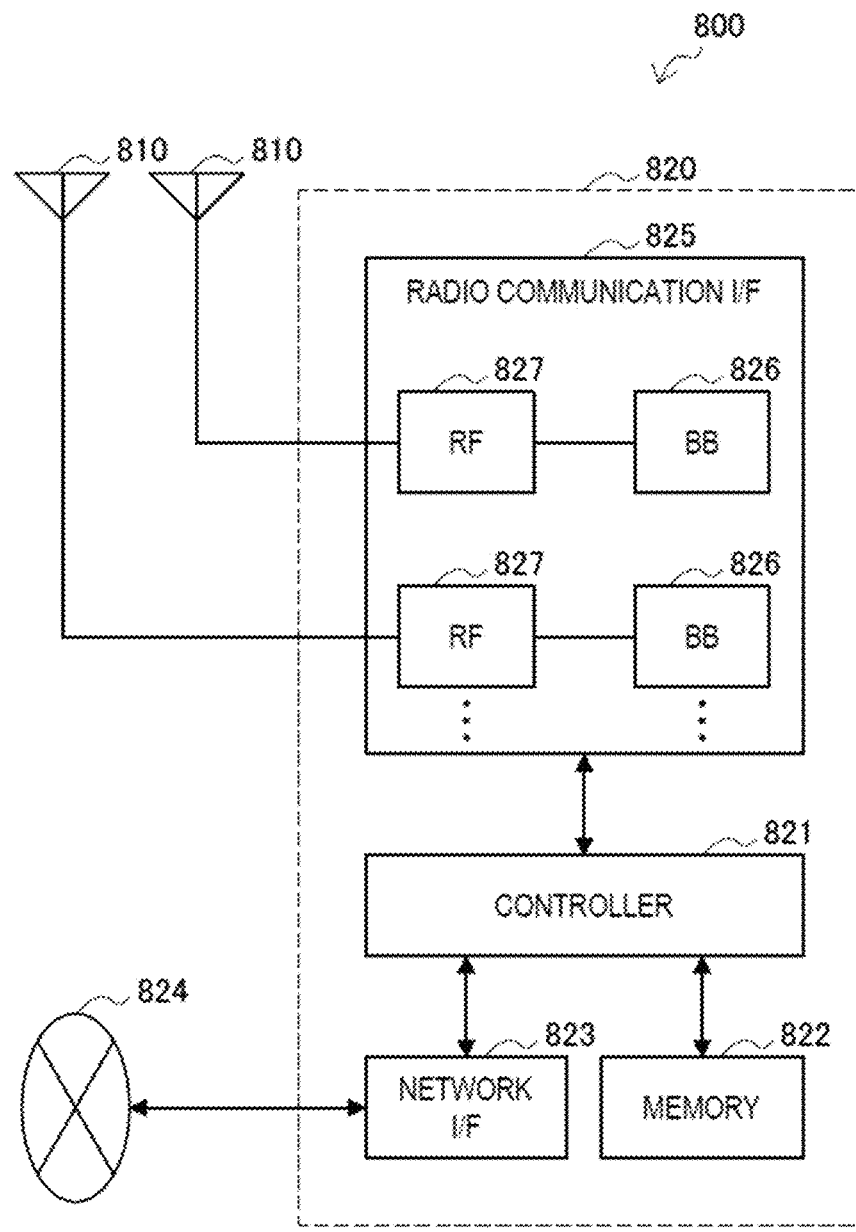
FIG. 10 is a block diagram showing a first example of a schematic configuration of an eNB or a gNB to which the technology of the present disclosure may be applied.

FIG. 10 is a block diagram showing a first example of a schematic configuration of an eNB or gNB to which the technology of the present disclosure can be applied. It should be noted that the following description is given by taking the eNB as an example, which is also applicable to the gNB. An eNB 800 includes one or more antennas 810 and a base station device 820. The base station device 820 and each of the antennas 810 may be connected to each other via a RF cable.

Each of the antennas 810 includes a single or multiple antenna elements (such as multiple antenna elements included in a Multi-Input Multi-Output (MIMO) antenna), and is used for the base station equipment 820 to transmit and receive wireless signals. As shown in FIG. 10, the eNB 800 may include multiple antennas 810. For example, the multiple antennas 810 may be compatible with multiple frequency bands used by the eNB 800. Although FIG. 10 shows an example in which the eNB 800 includes multiple antennas 810, the eNB 800 may also include a single antenna 810.

The base station equipment 820 includes a controller 821, a memory 822, a network interface 823, and a radio communication interface (1/F) 825.

The controller 821 may be, for example, a CPU or a DSP, and manipulate various functions of a higher layer of the base station equipment 820. For example, the controller 821 generates a data packet based on data in a signal processed by the radio communication interface 825, and transfers the generated packet via the network interface 823. The controller 821 may bundle data from multiple baseband processors to generate a bundled packet, and transfer the generated bundled packet. The controller 821 may have a logical function for performing control such as radio resource control, radio bearer control, mobility management, admission control, and scheduling. The control may be executed in conjunction with nearby eNBs or core network nodes. The memory 822 includes an RAN and an ROM, and stores programs executed by the controller 821 and various types of control data (such as a terminal list, transmission power data, and scheduling data).

The network interface 823 is a communication interface for connecting the base station equipment 820 to a core network 824. The controller 821 may communicate with a core network node or another eNB via the network interface 823. In this case, the eNB 800 and the core network node or other eNBs may be connected to each other through a logical interface (such as an S1 interface and an X2 interface). The network interface 823 may also be a wired communication interface, or a wireless communication interface for a wireless backhaul line. If the network interface 823 is a wireless communication interface, the network interface 823 may use a higher frequency band for wireless communications than the frequency band used by the radio communication interface 825.

The radio communication interface 825 supports any cellular communication scheme (such as Long Term Evolution (LIE) and LTE-Advanced), and provides wireless connection to a terminal located in a cell of the eNB 800 via an antenna 810. The radio communication interface 825 may generally include, for example, a baseband (BB) processor 826 and an RF circuit 827. The BB processor 826 may execute, for example, encoding/decoding, modulation/demodulation, and multiplexing/demultiplexing, and execute various types of signal processing of layers (such as, L1, Medium Access Control (MAC), Radio Link Control (RLC), and Packet Data Convergence Protocol (PDCP)). Instead of the controller 821, the BB processor 826 may have a part or all of the above-mentioned logical functions. The BB processor 826 may be a memory storing a communication control program, or a module including a processor and related circuits configured to execute the program. An update program may cause the function of the BB processor 826 to be changed. The module may be a card or blade inserted into a slot of the base station equipment 820. Alternatively, the module may also be a chip mounted on a card or blade. Meanwhile, the RF circuit 827 may include, for example, a mixer, a filter, and an amplifier, and transmit and receive a wireless signal via the antenna 810.

As shown in FIG. 10, the radio communication interface 825 may include multiple BB processors 826. For example, the multiple BB processors 826 may be compatible with multiple frequency bands used by the eNB 800. As shown in FIG. 10, the radio communication interface 825 may include multiple RE circuits 827. For example, the multiple RF circuits 827 may be compatible with multiple antenna elements. Although FIG. 10 shows an example in which the radio communication interface 825 includes multiple BB processors 826 and multiple RF circuits 827, the radio communication interface 825 may also include a single BB processor 826 or a single RF circuit 827.

In the eNB 800 as shown in FIG. 10, the transceiver may be implemented by a radio communication interface 825. At least a part of the function may also be implemented by the controller 821.

Second Application Example

Figure 11:
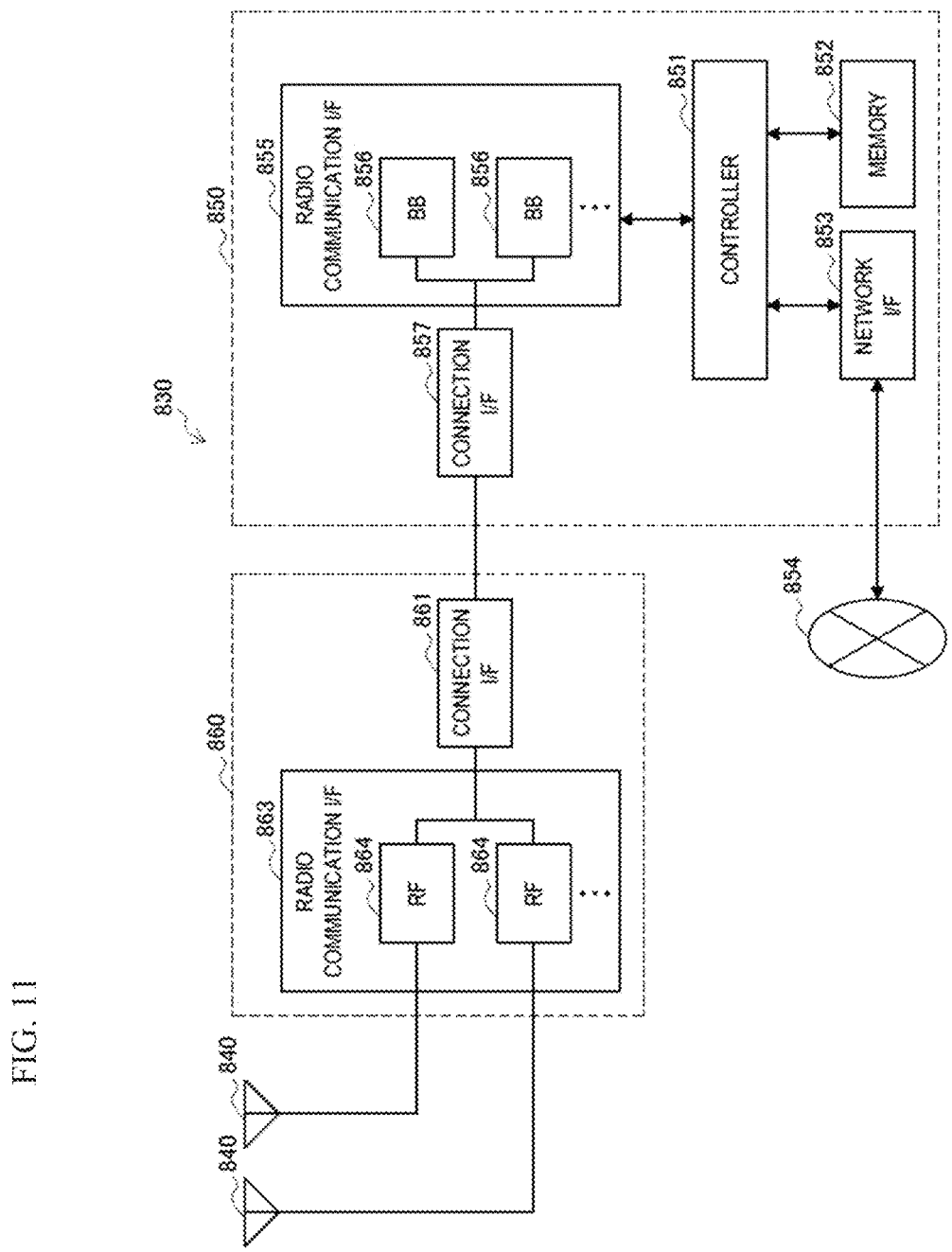
FIG. 11 is a block diagram showing a second example of a schematic configuration of an eNB or a gNB to which the technology according to the present disclosure may be applied.

FIG. 11 is a block diagram showing a second example of a schematic configuration of an eNB or gNB to which the technology of the present disclosure can be applied. It should be noted that the following description is given by taking the eNB as an example, which is also applied to the gNB. An eNB 830 includes one or more antennas 840, base station equipment 850, and an RRH 860. The RRH 860 and each antenna 840 may be connected to each other via an RF cable. The base station equipment 850 and the RRH 860 may be connected to each other via a high-speed line such as an optical fiber cable.

Each of the antennas 840 includes a single or multiple antenna elements (such as multiple antenna elements included in a MIMO antenna) and is used for the RRH 860 to transmit and receive a wireless signal. As shown in FIG. 11, the eNB 830 may include multiple antennas 840. For example, the multiple antennas 840 may be compatible with multiple frequency bands used by the eNB 830. Although FIG. 11 shows an example in which the eNB 830 includes multiple antennas 840, the eNB 830 may also include a single antenna 840.

The base station equipment 850 includes a controller 851, a memory 852, a network interface 853, a radio communication interface 855, and a connection interface 857. The controller 851, the memory 852, and the network interface 853 are the same as the controller 821, the memory 822, and the network interface 823 as described with reference to FIG. 10.

The radio communication interface 855 supports any cellular communication scheme (such as LTE and LTE-Advanced), and provides wireless communications to a terminal located in a sector corresponding to the RRH 860 via the RRH 860 and the antenna 840. The radio communication interface 855 may generally include, for example, a BB processor 856. The BB processor 856 is the same as the BB processor 826 as described with reference to FIG. 10 except that the BB processor 856 is connected to the RF circuit 864 of the RRH 860 via the connection interface 857. As shown in FIG. 11, the radio communication interface 855 may include multiple BB processors 856. For example, the multiple BB processors 856 may be compatible with multiple frequency bands used by the eNB 830. Although FIG. 11 shows an example in which the radio communication interface 855 includes multiple BB processors 856, the radio communication interface 855 may also include a single BB processor 856.

The connection interface 857 is an interface for connecting the base station equipment 850 (radio communication interface 855) to the RRH 860. The connection interface 857 may also be a communication module for communication in the above-mentioned high-speed line that connects the RRH 860 to the base station equipment 850 (radio communication interface 855).

The RRH 860 includes a connection interface 861 and a radio communication interface 863.

The connection interface 861 is an interface for connecting the RRH 860 (radio communication interface 863) to the base station equipment 850. The connection interface 861 may also be a communication module for communication in the above-mentioned high-speed line.

The radio communication interface 863 transfers and receives wireless signals via the antenna 840. The radio communication interface 863 may generally include, for example, an RF circuit 864. The RF circuit 864 may include, for example, a mixer, a filter, and an amplifier, and transfer and receive wireless signals via the antenna 840. As shown in FIG. 11, the radio communication interface 863 may include multiple RF circuits 864. For example, the multiple RF circuits 864 may support multiple antenna elements. Although FIG. 11 shows an example in which the radio communication interface 863 includes multiple RF circuits 864, the radio communication interface 863 may also include a single RF circuit 864.

In the eNB 830 as shown in FIG. 11, the transceiver may be implemented by the radio communication interface 855. At least a part of the function may also be implemented by the controller 851.

Application Example about User Equipment

First Application Example

Figure 12:
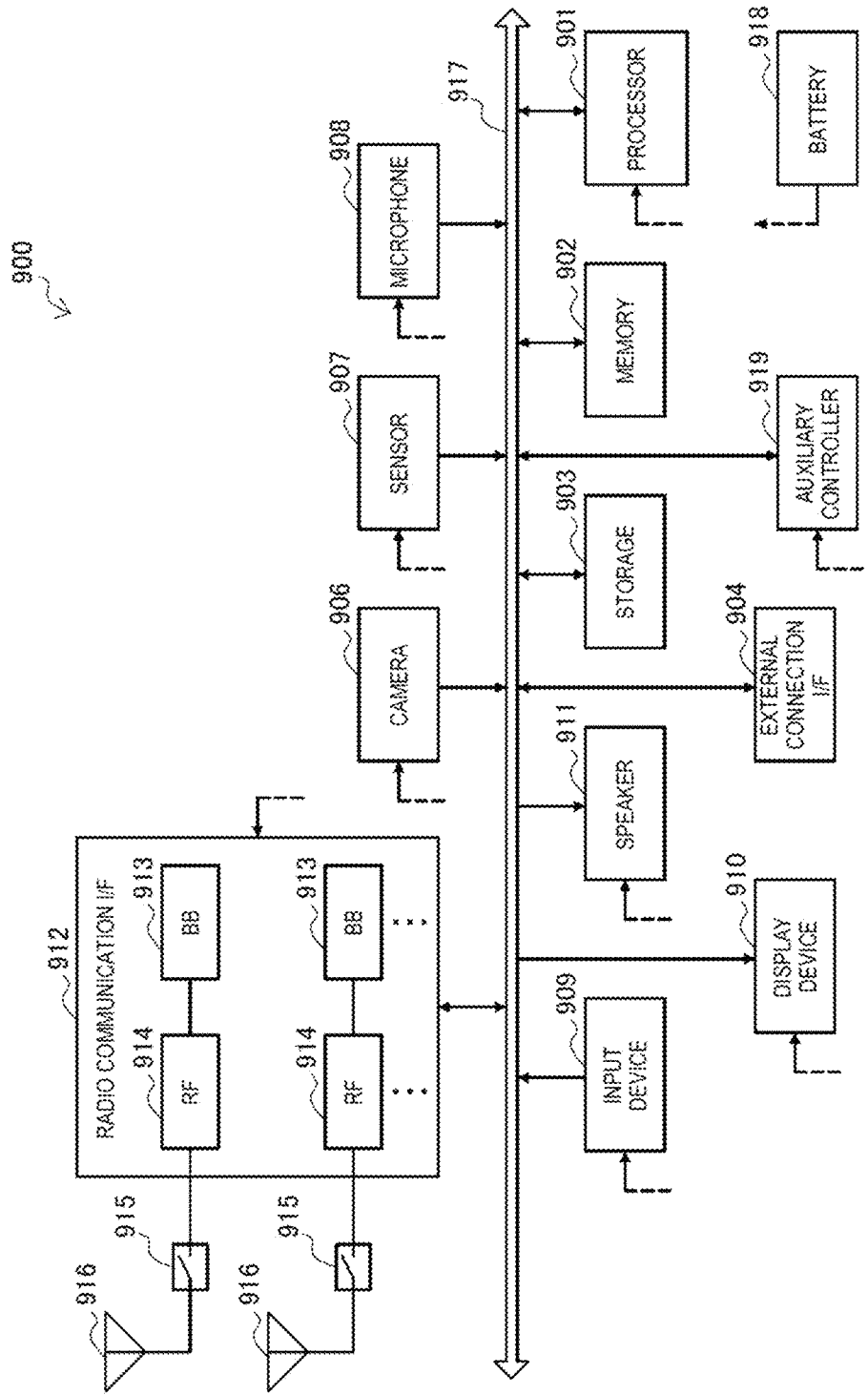
FIG. 12 is a block diagram showing an example of a schematic configuration of a smartphone to which the technology according to the present disclosure may be applied.

FIG. 12 is a block diagram showing an example of a schematic configuration of a smart phone to which the technology of the present disclosure can be applied. The smart phone 900 includes a processor 901, a memory 902, a storage 903, an external connection interface 904, an camera 906, a sensor 907, a microphone 908, an input device 909, a display device 910, a speaker 911, a radio communication interface 912, one or more antenna switches 915, one or more antennas 916, a bus 917, a battery 918, and an auxiliary controller 919.

The processor 901 may be, for example, a CPU or a system on a chip (SoC), and controls the functions of the application layer and other layers of the smart phone 900. The memory 902 includes an RAM and an ROM, and stores data and programs executed by the processor 901. The storage 903 may include a storage medium such as a semiconductor memory and a hard disk. The external connection interface 904 is an interface for connecting an external device (such as a memory card and a universal serial bus (USB) device) to the smart phone 900.

The camera 906 includes an image sensor (such as a charge coupled device (CCD) and a complementary metal oxide semiconductor (CMOS)), and generates a captured image. The sensor 907 may include a group of sensors, such as a measurement sensor, a gyro sensor, a geomagnetic sensor, and an acceleration sensor The microphone 908 converts sound input to the smart phone 900 into an audio signal. The input device 909 includes, for example, a touch sensor, a keypad, a keyboard, a button, or a switch configured to detect a touch on a screen of the display device 910, and receives an operation or information input from the user. The display device 910 includes a screen (such as a liquid crystal display (LCD) and an organic light emitting diode (OLED) display), and displays an output image of the smart phone 900. The speaker 911 converts the audio signal output from the smart phone 900 into sound.

The radio communication interface 912 supports any cellular communication scheme (such as LTE and LTE-Advanced), and executes wireless communications. The radio communication interface 912 may generally include, for example, a BB processor 913 and an RF circuit 914. The BB processor 913 may execute, for example, encoding/decoding, modulation/demodulation, and multiplexing/demultiplexing, and execute various types of signal processing for wireless communications. Meanwhile, the RF circuit 914 may include, for example, a mixer, a filter, and an amplifier, and transmit and receive wireless signals via the antenna 916. Note that, although the Figure shows a circumstance where one RF link is connected with one antenna, this is only schematic, and a circumstance where one RF link is connected with multiple antennas through multiple phase shifters is also included. The radio communication interface 912 may be a chip module on which the BB processor 913 and the RF circuit 914 are integrated. As shown in FIG. 12, the radio communication interface 912 may include multiple BB processors 913 and multiple RF circuits 914. Although FIG. 12 shows an example in which the radio communication interface 912 includes multiple BB processors 913 and multiple RF circuits 914, the radio communication interface 912 may also include a single BB processor 913 or a single RF circuit 914.

Furthermore, in addition to the cellular communication scheme, the radio communication interface 912 may support other types of wireless communication schemes, such as a short-range wireless communication scheme, a near field communication scheme, and a wireless local area network (LAN) scheme. In this case, the radio communication interface 912 may include a BB processor 913 and an RF circuit 914 for each wireless communication scheme.

Each of the antenna switches 915 switches a connection destination of the antenna 916 among multiple circuits included in the radio communication interface 912 (such as, circuits for different wireless communication schemes).

Each of the antennas 916 includes a single or multiple antenna elements (such as multiple antenna elements included in a MIMO antenna), and is used for the radio communication interface 912 to transmit and receive wireless signals. As shown in FIG. 12, the smart phone 900 may include multiple antennas 916. Although FIG. 12 shows an example in which the smart phone 900 includes multiple antennas 916, the smart phone 900 may also include a single antenna 916.

Furthermore, the smart phone 900 may include an antenna 916 for each wireless communication scheme. In this case, the antenna switch 915 may be omitted from the configuration of the smart phone 900.

The bus 917 connects the processor 901, the memory 902, the storage 903, the external connection interface 904, the camera 906, the sensor 907, the microphone 908, the input device 909, the display device 910, the speaker 911, the radio communication interface 912, and the auxiliary controller 919 to each other. The battery 918 supplies power to each block of the smart phone 900 as shown in FIG. 12 via a feeder line, which is partially shown as a dashed line in the Figure. The auxiliary controller 919, for example, manipulates the least necessary function of the smart phone 900 in a sleep mode.

In the smart phone 900 as shown in FIG. 12, the transceiver of the electronic apparatus 100 may be implemented by the radio communication interface 912. At least a part of the function may also be implemented by the processor 901 or the auxiliary controller 919. For example, the processor 901 or the auxiliary controller 919 may perform the functions of the transmission unit 102 and the determination unit 104 described above with reference to FIG. 1 to perform repeated transmission on transport blocks in an unscheduled manner on an unlicensed frequency band and to determine redundancy version numbers corresponding to the transmitted transport blocks.

Second Application Example

Figure 13:
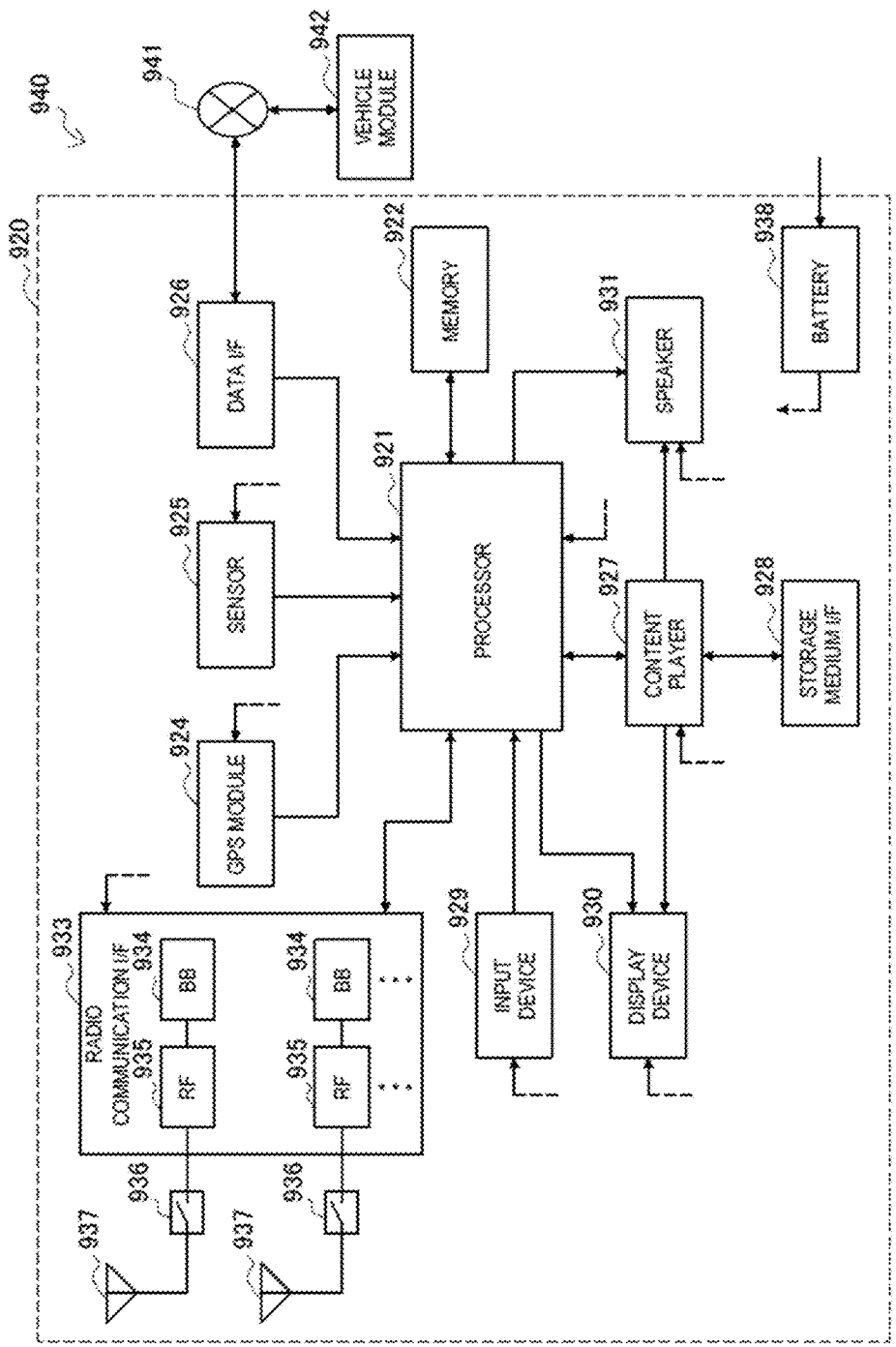
FIG. 13 is a block diagram showing an example of a schematic configuration of a automobile navigation equipment to which the technology according to the present disclosure may be applied.

FIG. 13 is a block diagram showing an example of a schematic configuration of automobile navigation equipment to which the technology according to the present disclosure may be applied. The automobile navigation equipment 920 includes a processor 921, a memory 922, a global positioning system (GPS) module 924, a sensor 925, a data interface 926, a content player 927, a storage medium interface 928, an input device 929, a display device 930, a speaker 931, a radio communication interface 933, one or more antenna switches 936, one or more antennas 937, and a battery 938.

The processor 921 may be, for example, a CPU or a SoC, and controls the navigation function of the automobile navigation equipment 920 and additional functions. The memory 922 includes an RAM and an ROM, and stores data and programs executed by the processor 921.

The GPS module 924 uses a GPS signal received from a. GPS satellite to measure a position of the automobile navigation equipment 920 (such as latitude, longitude, and altitude). The sensor 925 may include a group of sensors, such as a gyro sensor, a geomagnetic sensor, and an air pressure sensor. The data interface 926 is connected to, for example, an in-vehicle network 941 via a terminal not shown, and acquires data (such as vehicle speed data) generated by a vehicle.

The content player 927 reproduces content stored in a storage medium (such as a CD and a DVD), which is inserted into the storage medium interface 928. The input device 929 includes, for example, a touch sensor, a button, or a switch configured to detect a touch on a screen of the display device 930, and receives an operation or information input from the user. The display device 930 includes a screen such as an LCD or OLED display, and displays an image of a navigation function or reproduced content. The speaker 931 outputs the sound of the navigation function or the reproduced content.

The radio communication interface 933 supports any cellular communication scheme (such as LTE and LTE-Advanced), and executes wireless communication. The radio communication interface 933 may generally include, for example, a BB processor 934 and an RF circuit 935. The BB processor 934 may execute, for example, encoding/decoding, modulation/demodulation, and multiplexing/demultiplexing, and execute various types of signal processing for wireless communications. Meanwhile, the RF circuit 935 may include, for example, a mixer, a filter, and an amplifier, and transmit and receive wireless signals via the antenna 937. The radio communication interface 933 may also be a chip module on which the BB processor 934 and the RF circuit 935 are integrated. As shown in FIG. 13, the radio communication interface 933 may include multiple BB processors 934 and multiple RF circuits 935. Although FIG. 13 shows an example in which the radio communication interface 933 includes multiple BB processors 934 and multiple circuits 935, the radio communication interface 933 may also include a single BB processor 934 or a single RF circuit 935.

Furthermore, in addition to the cellular communication scheme, the radio communication interface 933 may support types of wireless communication schemes, such as a short-range wireless communication scheme, a near field communication scheme, and a wireless LAN scheme. In this case, the radio communication interface 933 may include a BB processor 934 and an RF circuit 935 for each wireless communication scheme.

Each of the antenna switches 936 switches a connection destination of the antenna 937 among multiple circuits included in the radio communication interface 933 (such as, circuits for different wireless communication schemes).

Each of the antennas 937 includes a single or multiple antenna elements (such as multiple antenna elements included in a MIMO antenna), and is used for the radio communication interface 933 to transmit and receive wireless signals. As shown in FIG. 13, the automobile navigation equipment 920 may include multiple antennas 937. Although FIG. 13 shows an example in which the automobile navigation equipment 920 includes multiple antennas 937, the automobile navigation equipment 920 may also include a single antenna 937.

Furthermore, the automobile navigation equipment 920 may include an antenna 937 for each wireless communication scheme. In this case, the antenna switch 936 may be omitted from the configuration of the automobile navigation equipment 920.

The battery 938 supplies power to each block of the automobile navigation equipment 920 as shown in FIG. 13 via a feeder line, which is partially shown as a dashed line in the Figure. The battery 938 accumulates electric power supplied from the vehicle.

In the automobile navigation equipment 920 as shown in FIG. 13, the transceiver of the electronic apparatus 100 may be implemented by the radio communication interface 912. At least a part of the function may also be implemented by the processor 901 or the auxiliary controller 919. For example, the processor 901 or the auxiliary controller 919 may perform the functions of the transmission unit 102 and the determination unit 104 described above with reference to FIG. 1 to perform repeated transmission on transport blocks in an unscheduled manner on an unlicensed frequency band and to determine redundancy version numbers corresponding to the transmitted transport blocks.

The technology of the present disclosure may also be implemented as an in-vehicle system (or vehicle) 940 including one or more blocks in the automobile navigation equipment 920, the in-vehicle network 941, and the vehicle module 942. The vehicle module 942 generates vehicle data (such as vehicle speed, engine speed, and failure information), and outputs the generated data to the in-vehicle network 941.

The basic principle of the present disclosure has been described above in conjunction with specific embodiments. However, it should be pointed out that, for those skilled in the art, it could be understood that all or any step or component of the methods and devices of the present disclosure may be implemented in any computing device (including processors, storage media, and the like) or network of computing devices in the form of hardware, firmware, software, or a combination thereof. This can be achieved by those skilled in the art utilizing their basic circuit design knowledge or basic programming skills after reading the description of the present disclosure.

Moreover, the present disclosure also proposes a program product storing a machine-readable instruction code that, when read and executed by a machine, can execute the above-mentioned methods according to the embodiments of the present disclosure.

Accordingly, a storage medium for carrying the above-mentioned program product storing a machine-readable instruction code is also included in the present disclosure. The storage medium includes, but is not limited to, a floppy disk, an optical disk, a magneto-optical disk, a memory card, and a memory stick.

Figure 14:
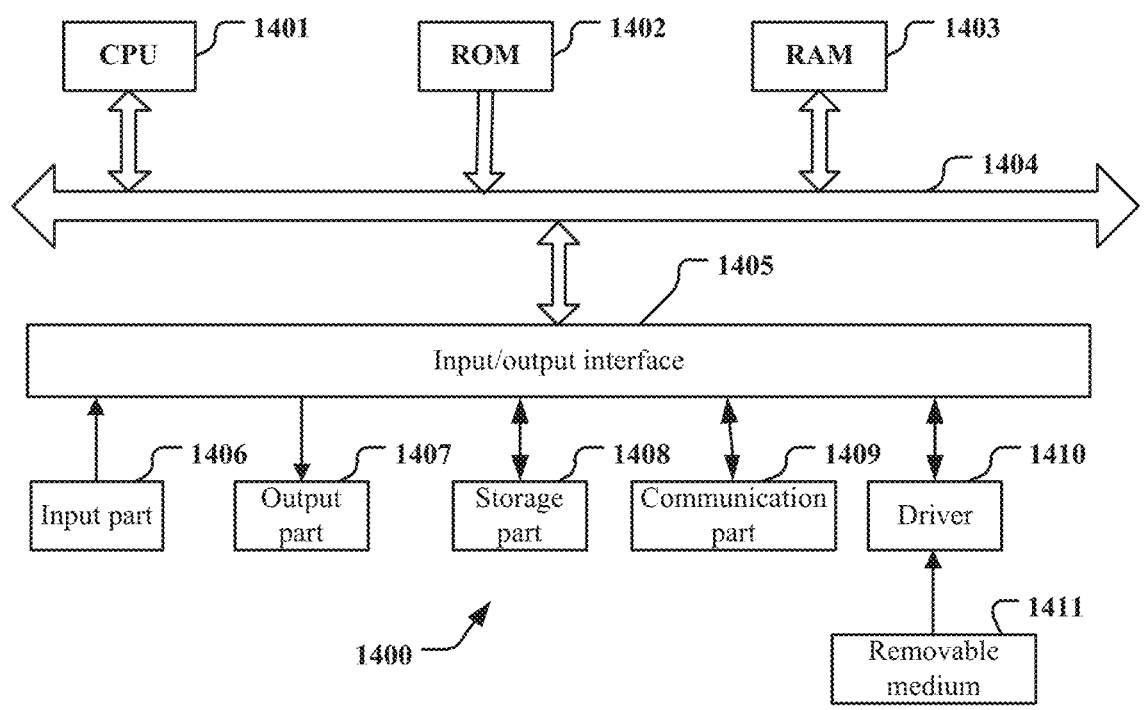
FIG. 14 is a block diagram showing an exemplary structure of a personal computer which may be employed in the embodiments of the present disclosure.

In a case where the present disclosure is implemented by software or firmware, a program constituting the software is installed from a storage medium or a network to a computer with a dedicated hardware structure (such as, a general-purpose computer 1400 as shown in FIG. 14), and the computer, when installed with various programs, can execute various functions and the like.

In FIG. 14, a central processing unit (CPU) 1401 executes various processing in accordance with a program stored in a read only memory (ROM) 1402 or a program loaded from a storage part 1408 to a random access memory (RAM) 1403. In the RAM 1403, data required when the CPU 1401 executes various processing and the like is also stored according to requirements. The CPU 1401, the ROM 1402, and the RAM 1403 are connected to each other via a bus 1404. The input/output interface 1405 is also connected to the bus 1404.

The following components are connected to the input/output interface 1405: an input part 1406 (including a keyboard, a mouse, and the like), an output part 1407 (including a display, such as a cathode ray tube (CRT), a liquid crystal display (LCD) and the like, and a speaker and the like), a storage part 1408 (including a hard disk and the like), and a communication part 1409 (including a network interface card such as an LAN card, a modem, and the like). The communication part 1409 executes communication processing via a network such as the Internet. The driver 1410 may also be connected to the input/output interface 1405 according to requirements. A removable medium 1411 such as a magnetic disk, an optical disk, a magneto-optical disk, a semiconductor memory and the like is installed on the driver 1410 according to requirements, so that a computer program read out therefrom is installed into the storage part 1408 according to requirements.

In a case where the above-mentioned series of processing is implemented by software, a program constituting the software is installed from a network such as the Internet or a storage medium such as the removable medium 1411.

Those skilled in the art should understand that, the storage medium is not limited to the removable medium 1411 as shown in FIG. 14 which has a program stored therein and which is distributed separately from an apparatus to provide the program to users. Examples of the removable media 1411 include magnetic disks (including a floppy disk (registered trademark)), an optical disk (including a compact disk read-only memory (CD-ROM) and a digital versatile disk (DVD)), a magneto-optical disk (including a mini disk (MD) (registered trademark)), and a semiconductor memory. Alternatively, the storage medium may be the ROM 1402, a hard disk included in the storage part 1408, and the like, which have programs stored therein and which are distributed concurrently with the apparatus including them to users.

It should also be pointed out that in the devices, methods and systems according to the present disclosure, each component or each step may be decomposed and/or recombined. These decompositions and/or recombinations should be regarded as equivalent solutions of the present invention. Moreover, the steps of executing the above-mentioned series of processing may naturally be executed in chronological order in the order as described, but do not necessarily need to be executed in chronological order. Some steps may be executed in parallel or independently of each other.

Finally, it should be noted that, the terms "include", "comprise" or any other variants thereof are intended to cover non-exclusive inclusion, so that a process, method, article or apparatus that includes a series of elements not only includes those elements, but also includes other elements that are not explicitly listed, or but also includes elements inherent to such a process, method, article, or apparatus. Furthermore, in the absence of more restrictions, an element defined by sentence "including one . . . " does not exclude the existence of other identical elements in a process, method, article, or apparatus that includes the element.

Although the embodiments of the present disclosure have been described above in detail in conjunction with the accompanying drawings, it should be appreciated that, the above-described embodiments are only used to illustrate the present disclosure and do not constitute a limitation to the present disclosure. For those skilled in the art various modifications and changes may be made to the above-mentioned embodiments without departing from the essence and scope of the present invention. Therefore, the scope of the present invention is defined only by the appended claims and equivalent meanings thereof.

This technology may also be implemented as follows.

Appendix 1. An electronic apparatus for wireless communications, comprising:
  processing circuitry, configured to:
    in performing repeated transmission on transport blocks from a first transport block to a (repK)th transport block to a base station serving the electronic apparatus, if it is detected that an n-th time domain position is available in a case that first n−1 consecutive time domain positions in predetermined consecutive time domain positions configured by the base station for the repeated transmission are unavailable, perform repeated transmission on at least a part of the transport blocks from the first transport block to the (repK)th transport block starting at the n-th time domain position; and
    determine a redundancy version number corresponding to each of the transmitted transport blocks based on a first redundancy version pattern received from the base station; wherein
    repK represents a first repeated transmission number received from the base station, and n is an integer greater than or equal to 1 and less than or equal to repK.

Appendix 2. The electronic apparatus according to appendix 1, wherein the processing circuitry is configured to determine a (mod(n−1,4)+1)th data in the first redundancy version pattern as a redundancy version number corresponding to an n-th transport block, wherein mod( ) represents a remainder operation.

Appendix 3. The electronic apparatus according to appendix 1 or 2, wherein the processing circuitry is configured to abandon transmitting first n−1 transport blocks in the transport blocks from the first transport block to the (repK)th transport block in the first n−1 consecutive time domain positions in the predetermined consecutive time domain positions, and transmit at least the n-th transport block starting at the n-th time domain position in the predetermined consecutive time domain positions.

Appendix 4. The electronic apparatus according to appendix 3, wherein the processing circuitry is configured to:
  on detecting that there are i additional available time domain positions in a time domain period to which the predetermined consecutive time domain positions belong after the n-th transport block to the (repK)th transport block are sequentially transmitted in available time domain positions in the predetermined consecutive time domain positions, sequentially transmit first i transport blocks in the abandoned first n−1 transport blocks by using the i additional available time domain positions; and
  sequentially transmit transport blocks, which are in the transport blocks from the first transport block to the (repK)th transport block and have not been transmitted in the time domain period, in available time domain positions in a next time domain period of the same type as the time domain period, or abandon transmitting the transport blocks which have not been transmitted in the time domain period; wherein
  i is greater than or equal to 0 and less than or equal to n−1.

Appendix 5. The electronic apparatus according to appendix 1 or 2, wherein the processing circuitry is configured to transmit at least the first transport block starting at the n-th time domain position in the predetermined consecutive time domain positions.

Appendix 6. The electronic apparatus according to appendix 5, wherein the processing circuitry is further configured to:
  on detecting that there are more than or equal to repK-1 available time domain positions in a time domain period to which the predetermined consecutive time domain positions belong after the first transport block is transmitted, sequentially transmit a second transport block to the (repK)th transport block in the time domain period.

Appendix 7. The electronic apparatus according to appendix 5, wherein the processing circuitry is configured to:
  on detecting that there are j available time domain positions in a time domain period to which the predetermined consecutive time domain positions belong after the first transport block is transmitted, sequentially transmit j transport blocks starting from a second transport block by using the j available time domain positions; and
  sequentially transmit transport blocks, which are in the transport blocks from the first transport block to the (repK)th transport block and have not been transmitted in the time domain period, in a next time domain period of the same type as the time domain period, or abandon transmitting the transport blocks which have not been transmitted in the time domain period; wherein
  j is greater than or equal to 0 and less than repK-1.

Appendix 8. The electronic apparatus according to appendix 1, wherein the processing circuitry is configured to modify the first repeated transmission number repK to a second repeated transmission number repK' selected by the electronic apparatus, and modify the first redundancy version pattern to a second redundancy version pattern selected by the electronic apparatus.

Appendix 9. The electronic apparatus according to appendix 8, wherein the processing circuitry is configured to determine a (mod(n−1,4)+1)th data in the second redundancy version pattern as a redundancy version number corresponding to an m-th transport block, wherein mod( ) represents a remainder operation, and m is an integer greater than or equal to 1 and less than or equal to repK'.

Appendix 10. The electronic apparatus according to appendix 8 or 9, wherein the processing circuitry is configured to:
  on detecting that there are more than or equal to repK' available time domain positions in a time domain period to which the predetermined consecutive time domain positions belong, sequentially transmit the first transport block to a (repK')th transport block starting at the n-th time domain position in the predetermined consecutive time domain positions in the time domain period.

Appendix 11. The electronic apparatus according to appendix 8 or 9, wherein the processing circuitry is further configured to:
  on detecting that there are k available time domain positions in a time domain period to which the predetermined consecutive time domain positions belong, sequentially transmit the first transport block to a k-th transport block starting at the n-th time domain position in the predetermined consecutive time domain positions in the time domain period, and sequentially transmit transport blocks, which are in the transport blocks from the first transport block to the (repK')th transport block and have not been transmitted in the time domain period, in a next time domain period of the same type as the time domain period, or abandon transmitting the transport blocks which have not been transmitted in the time domain period; wherein k is greater than or equal to 0 and less than repK'.

Appendix 12. The electronic apparatus according to any one of appendixes 8 to 11, wherein the processing circuitry is configured to select the second repeated transmission number repK' and the second redundancy version pattern based on the number of available time domain positions remaining in the time domain period to which the predetermined consecutive time domain positions belong.

Appendix 13. The electronic apparatus according to any one of appendixes 8 to 12, wherein the processing circuitry is configured to add the second repeated transmission number repK' and the second redundancy version pattern in an uplink control indication UCI and transmit the second repeated transmission number repK' and the second redundancy version pattern to the base station.

Appendix 14. The electronic apparatus according to any one of appendixes 8 to 13, wherein the second repeated transmission number repK' is not equal to the first repeated transmission number repK, and/or the second redundancy version pattern is not equal to the first redundancy version patter.

Appendix 15. The electronic apparatus according to any one of appendixes 1 to 14, wherein the processing circuitry is configured to perform repeated transmission on transport blocks in an unscheduled manner on an unlicensed frequency band.

Appendix 16. A method for wireless communications, comprising:

in performing repeated transmission on transport blocks from a first transport block to a (repK)th transport block to a base station serving the electronic apparatus, if it is detected that an n-th time domain position is available in a case that first n−1 consecutive time domain positions in predetermined consecutive time domain positions configured by the base station for the repeated transmission are unavailable, performing repeated transmission on at least a part of the transport blocks from the first transport block to the (repK)th transport block starting at the n-th time domain position; wherein a redundancy version number corresponding to each of the transmitted transport blocks is determined based on a first redundancy version pattern received from the base station, and repK represents a first repeated transmission number and is received from the base station, and n is an integer greater than or equal to 1 and less than or equal to repK.

Appendix 17. A computer-readable storage medium having computer-executable instructions stored thereon, which when executed, cause the method for wireless communications according to appendix 16 to be performed.

The invention claimed is:

1. An electronic apparatus for wireless communications, comprising:

processing circuitry, configured to:

in performing repeated transmission on transport blocks from a first transport block to a (repK)th transport block to abase station serving the electronic apparatus, upon detecting that an n-th time domain position is available in a case that first n−1 consecutive time domain positions in predetermined consecutive time domain positions configured by the base station for the repeated transmission are unavailable, perform repeated transmission on at least a part of the transport blocks from the first transport block to the (repK)th transport block starting at the n-th time domain position; and determine a redundancy version number corresponding to each of the transmitted transport blocks based on a first redundancy version pattern received from the base station; wherein repK represents a first repeated transmission number received from the base station, and n is an integer greater than or equal to 1 and less than or equal to repK, wherein the processing circuitry is configured to modify the first repeated transmission number repK to a second repeated transmission number repK' selected by the electronic apparatus, and modify the first redundancy version pattern to a second redundancy version pattern selected by the electronic apparatus.

2. The electronic apparatus according to claim 1, wherein the processing circuitry is configured to determine a (mod (n−1,4)+1)th data in the first redundancy version pattern as a redundancy version number corresponding to an n-th transport block, wherein mod( ) represents a remainder operation.

3. The electronic apparatus according to claim 1, wherein the processing circuitry is configured to abandon transmitting first n−1 transport blocks in the transport blocks from the first transport block to the (repK)th transport block in the first n−1 consecutive time domain positions in the predetermined consecutive time domain positions, and transmit at least the n-th transport block starting at the n-th time domain position in the predetermined consecutive time domain positions.

4. The electronic apparatus according to claim 3, wherein the processing circuitry is configured to:

on detecting that there are i additional available time domain positions in a time domain period to which the predetermined consecutive time domain positions belong after the n-th transport block to the (repK)th transport block are sequentially transmitted in available time domain positions in the predetermined consecutive time domain positions, sequentially transmit first i transport blocks in the abandoned first n−1 transport blocks by using the i additional available time domain positions; and sequentially transmit transport blocks, which are in the transport blocks from the first transport block to the (repK)th transport block and have not been transmitted in the time domain period, in available time domain positions in a next time domain period of the same type as the time domain period, or abandon transmitting the transport blocks which have not been transmitted in the time domain period; wherein i is greater than or equal to 0 and less than or equal to n−1.

5. The electronic apparatus according to claim 1, wherein the processing circuitry is configured to transmit at least the first transport block starting at the n-th time domain position in the predetermined consecutive time domain positions.

6. The electronic apparatus according to claim 5, wherein the processing circuitry is further configured to:

on detecting that there are more than or equal to repK-1 available time domain positions in a time domain period to which the predetermined consecutive time domain positions belong after the first transport block is transmitted, sequentially transmit a second transport block to the (repK)th transport block in the time domain period.

7. The electronic apparatus according to claim 5, wherein the processing circuitry is configured to:
on detecting that there are j available time domain positions in a time domain period to which the predetermined consecutive time domain positions belong after the first transport block is transmitted, sequentially transmit j transport blocks starting from a second transport block by using the j available time domain positions; and
sequentially transmit transport blocks, which are in the transport blocks from the first transport block to the (repK)th transport block and have not been transmitted in the time domain period, in a next time domain period of the same type as the time domain period, or abandon transmitting the transport blocks which have not been transmitted in the time domain period; wherein
j is greater than or equal to 0 and less than repK-1.

8. The electronic apparatus according to claim 1, wherein the processing circuitry is configured to determine a (mod(n−1,4)+1)th data in the second redundancy version pattern as a redundancy version number corresponding to an m-th transport block, wherein mod( ) represents a remainder operation, and in is an integer greater than or equal to 1 and less than or equal to repK'.

9. The electronic apparatus according to claim 1, wherein the processing circuitry is configured to:
on detecting that there are more than or equal to repK' available time domain positions in a time domain period to which the predetermined consecutive time domain positions belong, sequentially transmit the first transport block to a (repK')th transport block starting at the n-th time domain position in the predetermined consecutive time domain positions in the time domain period.

10. The electronic apparatus according to claim 1, wherein the processing circuitry is further configured to:
on detecting that there are k available time domain positions in a time domain period to which the predetermined consecutive time domain positions belong, sequentially transmit the first transport block to a k-th transport block starting at the n-th time domain position in the predetermined consecutive time domain positions in the time domain period; and
sequentially transmit transport blocks, which are in the transport blocks from the first transport block to the (repK')th transport block and have not been transmitted in the time domain period, in a next time domain period of the same type as the time domain period, or abandon transmitting the transport blocks which have not been transmitted in the time domain period; wherein
k is greater than or equal to 0 and less than repK'.

11. The electronic apparatus according to claim 1, wherein the processing circuitry is configured to select the second repeated transmission number repK' and the second redundancy version pattern based on the number of available time domain positions remaining in the time domain period to which the predetermined consecutive time domain positions belong.

12. The electronic apparatus according to claim 1, wherein the processing circuitry is configured to add the second repeated transmission number repK' and the second redundancy version pattern in an uplink control indication (UCI) and transmit the second repeated transmission number repK' and the second redundancy version pattern to the base station.

13. The electronic apparatus according to claim 1, wherein the second repeated transmission number repK' is not equal to the first repeated transmission number repK, and/or the second redundancy version pattern is not equal to the first redundancy version pattern.

14. The electronic apparatus according to claim 1, wherein the processing circuitry is configured to perform repeated transmission on transport blocks in an unscheduled manner on an unlicensed frequency band.

15. A method for wireless communications, comprising:
in performing repeated transmission on transport blocks from a first transport block to a (repK)th transport block to a base station serving the electronic apparatus, upon detecting that an n-th time domain position is available in a case that first n−1 consecutive time domain positions in predetermined consecutive time domain positions configured by the base station for the repeated transmission are unavailable, performing repeated transmission on at least a part of the transport blocks from the first transport block to the (repK)th transport block starting at the n-th time domain position; wherein
a redundancy version number corresponding to each of the transmitted transport blocks is determined based on a first redundancy version pattern received from the base station, and
repK represents a first repeated transmission number and is received from the base station, and n is an integer greater than or equal to 1 and less than or equal to repK,
wherein the method further comprises modifying the first repeated transmission number repK to a second repeated transmission number repK' selected by the electronic apparatus, and modify the first redundancy version pattern to a second redundancy version pattern selected by the electronic apparatus.

16. A non-transitory computer-readable storage medium having computer-executable instructions stored thereon, which when executed, cause the method for wireless communications according to claim 15 to be performed.

17. An electronic apparatus for wireless communications, comprising:
processing circuitry, configured to:
in performing repeated transmission on transport blocks from a first transport block to a (repK)th transport block to a base station serving the electronic apparatus, upon detecting that an n-th time domain position is available in a case that first n−1 consecutive time domain positions in predetermined consecutive time domain positions configured by the base station for the repeated transmission are unavailable, perform repeated transmission on at least a part of the transport blocks from the first transport block to the (repK)th transport block starting at the n-th time domain position; and
determine a redundancy version number corresponding to each of the transmitted transport blocks based on a first redundancy version pattern received from the base station; wherein
repK represents a first repeated transmission number received from the base station, and n is an integer greater than or equal to 1 and less than or equal to repK,
wherein the processing circuitry is configured to:
determine a (mod(n−1,4)+1)th data in the first redundancy version pattern as a redundancy version number corresponding to an n-th transport block, wherein mod( ) represents a remainder operation, or abandon transmitting first n−1 transport blocks in the transport blocks from the first transport block to the (repK)th transport block in the first n−1 consecutive time domain positions in the predetermined consecutive time domain positions, and transmit at least the n-th transport block starting at the n-th time domain position in the predetermined consecutive time domain positions.

18. A method for wireless communications, comprising:
in performing repeated transmission on transport blocks from a first transport block to a (repK)th transport block to a base station serving the electronic apparatus, upon detecting that an n-th time domain position is available in a case that first n−1 consecutive time domain positions in predetermined consecutive time domain positions configured by the base station for the repeated transmission are unavailable, performing repeated transmission on at least a part of the transport blocks from the first transport block to the (repK)th transport block starting at the n-th time domain position; wherein a redundancy version number corresponding to each of the transmitted transport blocks is determined based on a first redundancy version pattern received from the base station, and repK represents a first repeated transmission number and is received from the base station, and n is an integer greater than or equal to 1 and less than or equal to repK, wherein the method further comprises:
  determining a (mod(n−1,4)+1)th data in the first redundancy version pattern as a redundancy version number corresponding to an n-th transport block, wherein mod( ) represents a remainder operation, or
  abandoning transmitting first n−1 transport blocks in the transport blocks from the first transport block to the (repK)th transport block in the first n−1 consecutive time domain positions in the predetermined consecutive time domain positions, and transmitting at least the n-th transport block starting at the n-th time domain position in the predetermined consecutive time domain positions.

\* \* \* \* \*